(12) United States Patent
Buerkle et al.

(10) Patent No.: US 8,195,362 B2
(45) Date of Patent: Jun. 5, 2012

(54) METHOD FOR CONTROLLING A DRIVER ASSISTANCE SYSTEM

(75) Inventors: Lutz Buerkle, Leonberg (DE); Tobias Rentschler, Pforzheim (DE); Thomas App, Zaisenhausen (DE)

(73) Assignee: Robert Bosch GmbH, Suttgart (DE)

( * ) Notice: Subject to any disclaimer, the term of this patent is extended or adjusted under 35 U.S.C. 154(b) by 411 days.

(21) Appl. No.: 12/305,166

(22) PCT Filed: Aug. 10, 2007

(86) PCT No.: PCT/EP2007/058326
§ 371 (c)(1),
(2), (4) Date: May 5, 2009

(87) PCT Pub. No.: WO2008/043591
PCT Pub. Date: Apr. 17, 2008

(65) Prior Publication Data
US 2009/0271071 A1 Oct. 29, 2009

(30) Foreign Application Priority Data
Oct. 9, 2006 (DE) .................... 10 2006 047 636

(51) Int. Cl.
*B60W 30/12* (2006.01)
(52) U.S. Cl. .......... 701/41; 701/116; 180/168; 180/169; 318/587; 342/71
(58) Field of Classification Search .......... 701/41, 701/36, 116, 1, 207; 180/167, 168, 169; 380/587, 580; 33/264; 340/61, 70, 71; 318/587, 318/580; 342/61, 70, 71
See application file for complete search history.

(56) References Cited

U.S. PATENT DOCUMENTS

| | | | |
|---|---|---|---|
| 6,567,039 B2 | 5/2003 | Shirai et al. | |
| 6,577,334 B1 | 6/2003 | Kawai et al. | |
| 7,265,657 B2 * | 9/2007 | Nishida et al. | 340/436 |
| 7,307,545 B2 * | 12/2007 | Nishida | 340/901 |
| 7,890,231 B2 * | 2/2011 | Saito et al. | 701/41 |
| 2005/0004731 A1 | 1/2005 | Bohm et al. | |
| 2005/0270374 A1 * | 12/2005 | Nishida et al. | 348/148 |
| 2006/0047390 A1 * | 3/2006 | Scherl et al. | 701/41 |
| 2008/0080740 A1 * | 4/2008 | Kaufmann | 382/104 |

FOREIGN PATENT DOCUMENTS

| | | |
|---|---|---|
| DE | 199 06 614 | 10/1999 |
| DE | 101 25 602 | 11/2001 |
| DE | 101 37 292 | 3/2003 |
| DE | 102 10 655 A1 * | 9/2004 |
| EP | 1 600 909 | 11/2005 |
| EP | 1 603 097 | 12/2005 |

OTHER PUBLICATIONS

International Search Report, PCT International Patent Application No. PCT/EP2007/058326, dated Nov. 2, 2007.

* cited by examiner

*Primary Examiner* — Paul N Dickson
*Assistant Examiner* — Keith Frisby
(74) *Attorney, Agent, or Firm* — Kenyon & Kenyon LLP

(57) ABSTRACT

A method for controlling a driver assistance system having an LKS function of a vehicle is described. In the region of lane widening, a hypothetical lane which connects a starting lane to a destination lane is generated by the driver assistance system. In the region of the lane widening, the vehicle is guided along the hypothetical lane.

18 Claims, 3 Drawing Sheets

METHOD FOR CONTROLLING A DRIVER ASSISTANCE SYSTEM

FIELD OF THE INVENTION

The present invention relates to a method for controlling a driver assistance system.

BACKGROUND INFORMATION

A driver assistance system having the function of lane departure warning (LDW) in which the driver of a vehicle is warned about leaving a lane by acoustic, visual, haptic warning signals or any combination thereof, has also in the meantime become commercially available for the field of commercial vehicles. The LKS (lane keeping support) function, which actively supports the driver in keeping the vehicle in the lane through directed guidance torques, i.e., intervention into the steering system of the vehicle, is of great practical importance.

A driver assistance system having an LKS function is described in Naab, Reichert: "Driver Assistance Systems for Lateral and Longitudinal Vehicle Guidance—Heading Control and Active Cruise Support," AVEC 94.

German Patent Application No. DE 101 37 292 A1 describes a method for operating a driver assistance system of a vehicle, in particular a motor vehicle, having servo-supported steering, which is characterized by the following steps: detecting or estimating ambient data of a preferably instantaneous traffic situation; detecting or estimating preferably instantaneous movement data of the vehicle; comparing the detected or estimated ambient data with the movement data of the vehicle; changing the support of a steering action in accordance with the comparison.

Special characteristics of the LKS function offering the driver support in keeping in the lane only in an edge area of the lane should be mass produced in the not-too-distant future. These systems do not intervene in a corridor around the center of the lane. This means that the driver must execute the guidance of the vehicle himself through steering movements within this corridor. To implement the LKS function, the driver assistance system includes an arrangement for detecting the course of the lane. This arrangement usually includes video sensors for detecting lane markings. The course of the lane in front of the vehicle and the relative position of the vehicle with respect to the lane are determined from two generally parallel lane markings. In situations in which no parallel lane markings are detectable, the LKS function is deactivated as a precautionary measure. Such a situation occurs, for example, in locations where a lane is widened. With such a lane widening, the road surface is widened and the single lane opens into multiple lanes.

SUMMARY

An object of the present invention is to improve upon a driver assistance system to the extent that the LKS function is utilizable even when there is a lane widening.

The approach according to an example embodiment of the present invention for achieving this object is that a hypothetical lane connecting a starting lane to a destination lane is formed by the driver assistance system in an area of lane widening. In the area of lane widening, the vehicle is then guided on the hypothetical lane until the driver assistance system detects a real lane again. The choice of the destination lane is then made on the basis of the steering activity of the driver of the vehicle.

The present invention may allow detection of lanes and use of the LKS function even in a complex traffic situation such as lane widening in particular in which one lane transitions into multiple lanes. This situation is often encountered on the highway and on rural roads. In the area of widening, directional traffic is initially guided on only a single lane. At the beginning of lane widening, the single lane, also referred to below as the starting lane, branches into multiple lanes, also referred to below as destination lanes. In accordance with the present invention, a hypothetical lane on which the LKS function may be executed is generated by detection and analysis of the steering performance of the driver (discernible through yawing movement, steering wheel angle of the vehicle). The hypothetical lane is formed by observation of only one lane marking. The vehicle is guided on this hypothetical lane until two generally parallel lane markings are again found bordering a real lane. Through a gentle transition from the hypothetical lane to the present real lane, the driver hardly notices the transition. There is thus a comfortable guidance behavior and a continuous usability of the LKS function even in a complex lane situation such as lane widening.

BRIEF DESCRIPTION OF THE DRAWINGS

Embodiments of the present invention are explained in greater detail below with reference to the figures.

DETAILED DESCRIPTION OF EXAMPLE EMBODIMENTS

Figure 1:
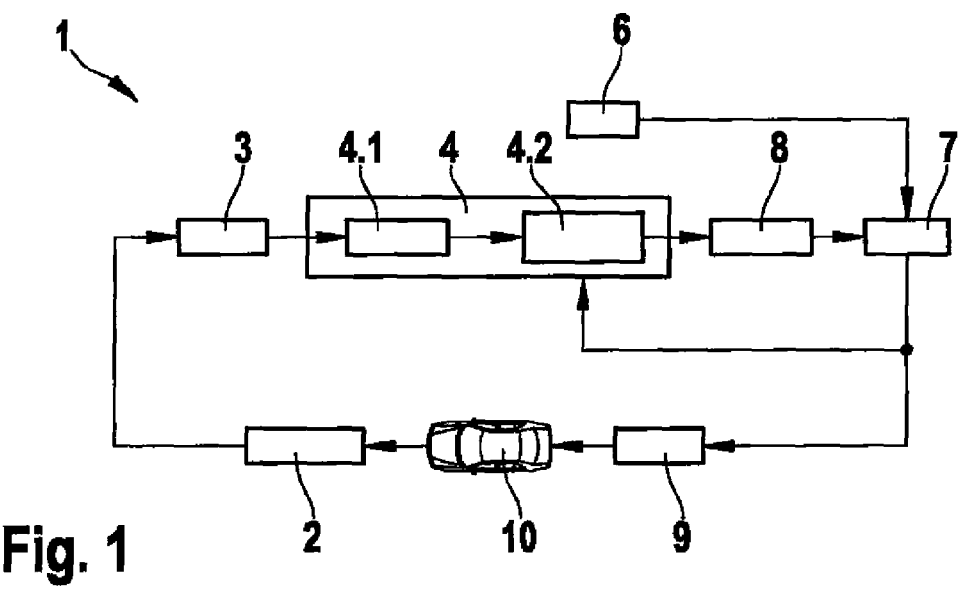
FIG. 1 shows a block diagram of a driver assistance system.
Figure 2:
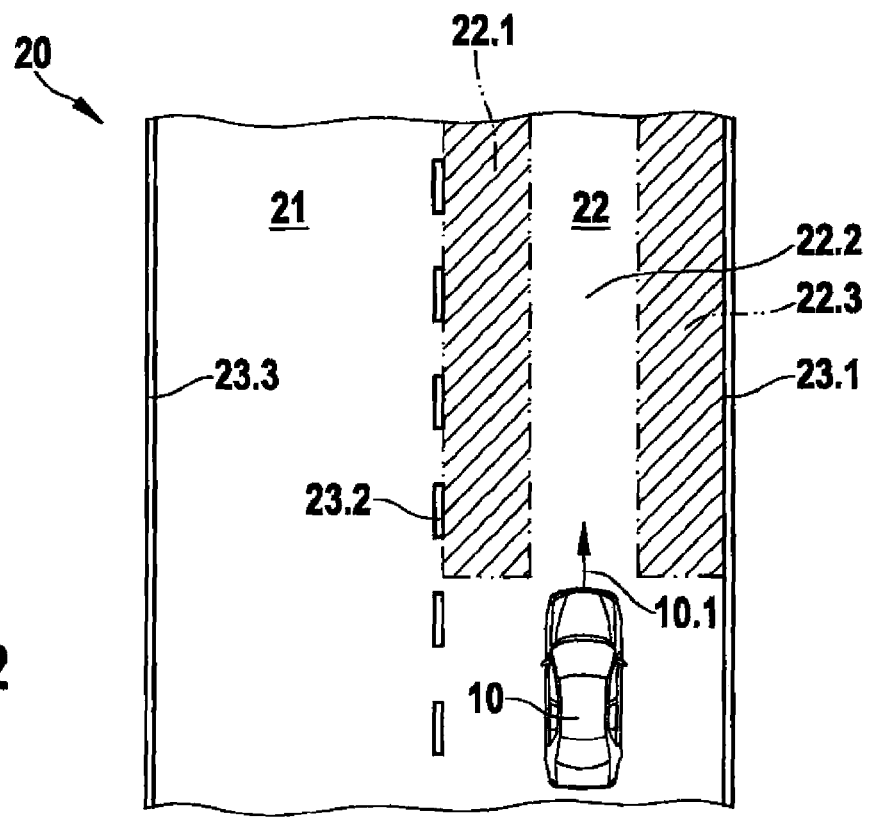
FIG. 2 shows a view of a lane having lane markings as seen from above.
Figure 3:
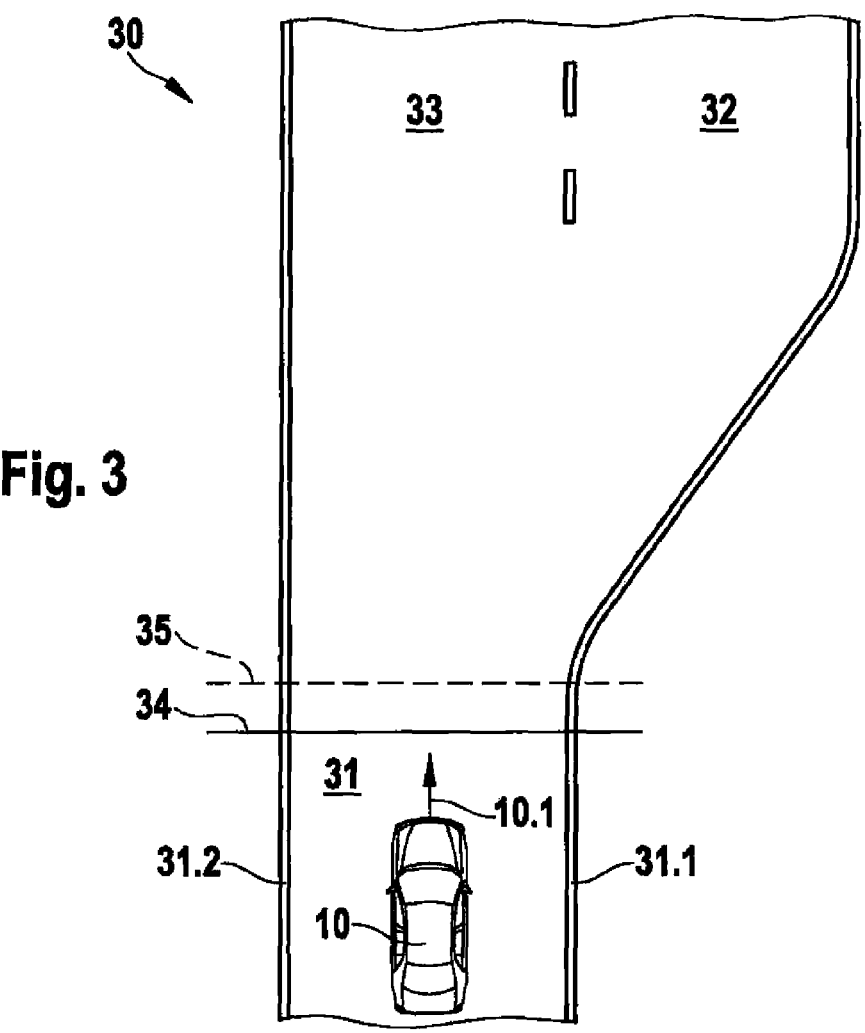
FIG. 3 shows a view of a traffic area with lane widening.

Embodiments of the present invention are explained in greater detail below with reference to the drawings. A block diagram of a driver assistance system 1 designed according to the present invention for a vehicle 10 having an LKS function is shown in FIG. 1. Driver assistance system 1 includes at least one sensor system 2 directed forward in the direction of travel for lane recognition. This is, for example, a video camera having an image sensor in CMOS or CCD technology. Block 6 represents the driver of vehicle 10, who operates steering 9 of vehicle 10 using steering wheel 7. An LKS function 4.2 is implemented in control unit 4 of driver assistance system 1, applying a system torque to the steering of the vehicle via a steering actuator 8. An LKS regulator 4.1, which is connected to a function module 3, is connected upstream from LKS function 4.2. As described below, function module 3 makes available a hypothetical lane, which allows activation of the LKS function even if no actual lane is discernible for driver assistance system 1 due to lack of suitable lane markings. Driver assistance system 1 having the LKS function shown in FIG. 1 guides vehicle 10 within the lane markings of a lane, a zone without system intervention by driver assistance system 1 being provided at the center of the lane. This is explained below with reference to FIG. 2, which depicts schematically a traffic area 20 having two lanes 21, 22. Lanes 21, 22 are bordered by lane markings 23.1, 23.2, 23.3. Vehicle 10 equipped with driver assistance system 1 is driving on lane 22. Central area 22.2 of lane 22 is a zone without system intervention, i.e., a zone in which the LKS function of the driver assistance system is not active and the driver is guiding vehicle 10 himself. However, the LKS function of driver assistance system 1 is active in adjacent outer areas 22.1, 22.3 of lane 22. In other words, driver assistance system 1 here performs a steering intervention for transverse guidance of vehicle 10, for example, to keep the vehicle within lane 22. Interventions by driver assistance system 1 are performed on the basis of the middle of the lane which represents the setpoint trajectory for the LKS function. With a traditional driver assistance system having an LKS function, the LKS function is deactivated as soon as the driver assistance system is unable to recognize generally parallel lane markings. This is the case in particular in lane widening in which one lane transitions into multiple connected lanes. Such a traffic situation is often encountered on multilane high-speed roads. This situation is depicted in FIG. 3, for example, which shows a traffic area 30. A road surface 31 bordered by lane markings 31.1, 31.2 widens and transitions into two connected lanes 32, 33. Vehicle 10 initially drives on lane 31 in the direction of arrow 10.1, and after driving over bordering line 34, enters a widened area in which one lane 31 transitions into two lanes 32, 33. Approximately beyond a second bordering line 35, the LKS function of a traditional driver assistance system having an LKS function would be deactivated because the driver assistance system is unable to detect any parallel lane markings. The present invention now makes it possible in an advantageous manner to maintain the LKS function even in such a traffic situation. When driving over bordering line 34, sensor system 2 of driver assistance system 1 recognizes that lane widening is apparently to be expected because lane markings 31.1, 31.2 are no longer parallel. Within a short period of time $t_1$, driver assistance system 1 then observes the steering movements by the driver and the resulting yawing movement of vehicle 10. In addition, the static torque of the first order is formed over one or both of the aforementioned variables:

$$\bar{\delta} = \frac{1}{n}\sum_{i=0}^{n}\delta_{-i*t_{samp}} \quad (1)$$

$$n = \text{rounded}\left(\frac{t_1}{t_{samp}}\right) \quad (2)$$

$$\bar{\dot{\Psi}} = \frac{1}{n}\sum_{i=0}^{n}\dot{\Psi}_{-i*t_{samp}} \quad (3)$$

in which
$t_{samp}$=sampling time of the driver assistance system;
$\delta$=steering wheel angle;
$\dot{\Psi}$=yaw rate.

On the basis of these values, the decision is made as to which lane the driver would like to drive in. At this point, the location of the future lane is not yet known to the driver assistance system. From the curvature in the area of the lane over which the vehicle has already driven, a reference yaw rate $\dot{\Psi}_{Ref}$ and/or a reference steering angle $\delta_{Ref}$ are then determined. The decision about the location of the destination lane desired by the driver is then made according to the following rules. For example, the lane situation depicted in FIG. 3 is used as the basis here. The following cases may be differentiated:

$$\text{Case 1: } \dot{\Psi} > \dot{\Psi}_{Ref} \quad (4)$$

This means that the driver would like to drive on a new lane which is located on the left with respect to original lane 31.

$$\text{Case 2: } \dot{\Psi} < \dot{\Psi}_{Ref} \quad (5)$$

This means that the driver would like to drive on a new lane which is located on the right with respect to original lane 31.

$$\text{Case 3: } \dot{\Psi} = \dot{\Psi}_{Ref} \quad (6)$$

This means that the driver would like to drive on a lane whose course corresponds to that of original lane 31.

In an advantageous variant of the embodiment of the present invention, the comparison in all three cases mentioned above may also be performed in a value interval around $\dot{\Psi}_{Ref}$ so that the exact value does not necessarily need to be determined. In addition, a plausibility check may also be performed advantageously using the steering wheel torque. The steering wheel torque is the force applied by the driver to the steering wheel in the sense of a rotational movement of the steering wheel. For example, if the driver steers to the right, he must apply a negative steering wheel torque and keep it constant, so that the vehicle will drive on the desired curve to the right. Similarly, a positive steering wheel torque must be applied for a curve to the left. Analyzing the plus or minus sign of the steering wheel torque or, better yet, analyzing the plus or minus sign of the steering wheel torque and the absolute value of the steering wheel torque, which may be compared with a predefinable threshold value, allows verification or a plausibility check of the direction decision derived from the yaw rate. It is thus possible to check on whether the driver actually wants to steer into the direction derived from the yaw rate.

Figure 4:
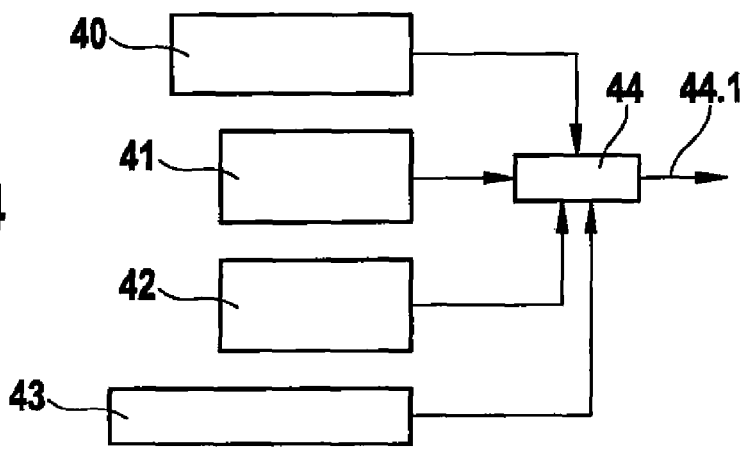
FIG. 4 shows a block diagram of a function module.
Figure 5:
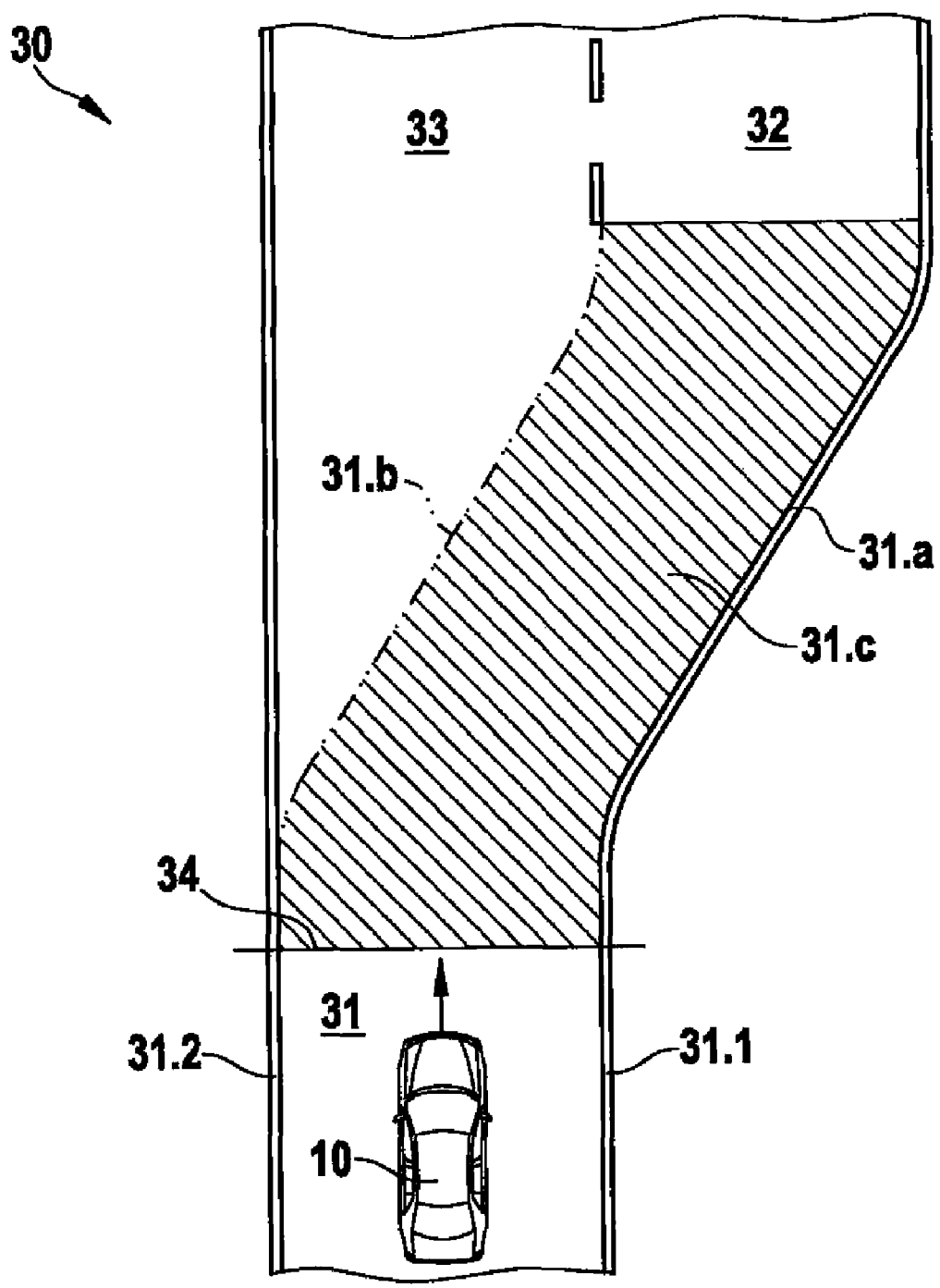
FIG. 5 shows a view of a traffic area with lane widening as seen from above.

Alternatively, the decision may also be made as a function of the steering wheel angle, depending on which sensor value represents the better starting basis. Sensor drift and sensor offset may be taken into account in this way. In another variant of the embodiment, the aforementioned decision may also be made as a function of the yaw rate and as a function of the steering wheel angle at the same time. FIG. 4 shows a block diagram to illustrate the decision structure. Function module 44 is responsible for selection of the decision criteria and the decision which is supplied at output 44.1 for forwarding to a decision unit. The decision relates to the position of lane reference line 31a, which is shown in FIG. 5 and which borders newly taken lane 32. Decision criteria supplied to the input of function module 44 include the torque of the first order via the steering wheel angle (function module 42), the torque of the first order via the yaw rate (function module 41) and the steering wheel torque (function module 40). In addition, reference values for the yaw rate and steering wheel angle, which are ascertained by function module 43, are sent to function module 44. The calculation of these reference values is based on a vehicle model. The reference values are ascertained according to the following equations:

$$\dot{\Psi}_{Ref} = v * \kappa_{Road} \quad (8)$$

$$\delta_{Ref} = l * \kappa_{Road} + \alpha_V - \alpha_H \quad (9)$$

wherein
V=speed of the vehicle,
l=wheel base,
$\alpha_V$=inclined-position angle of front wheel,
$\alpha_H$=inclined-position angle of rear wheel, and
$\kappa_{Road}$=curvature of the lane.

If there is a decision, then a hypothetical lane is generated in function module 3 shown in FIG. 1. The decision unit provides this function module with the information about which line is selected as the lane reference line and is to be used to form a hypothetical lane. As a result of the decision, the following variants are considered:
Case 1: a line to the left of the vehicle is evaluated as a reference line;

Case 2: a line to the right of the vehicle is evaluated as a reference line;
Case 3: a line to the right or left of the vehicle and having approximately the same curvature as the original lane (lane 31) is evaluated as a reference line.

On the basis of the selected reference line, the hypothetical future lane is then formed. The following assumptions are used in doing so. A standard width, e.g., a value of 3.6 meters, is assumed as the width of the lane. Alternatively, the width of original lane 31 may be assumed to be the width of the hypothetical lane. In addition, this assumes that the second line bordering the hypothetical lane runs generally parallel to the reference line, i.e., its curves are generally identical. All the relative variables such as the cross-track distance of the vehicle, and the differential angle, are formed on the basis of the hypothetical lane thereby ascertained. The entire functionality of the LKS function is thus also available in this complex lane situation, which includes lane widening. If parallel lines of a destination lane are detected, there is a smooth transition between the hypothetical lane and the actual lane. This sequence is explained below with reference to FIG. 5. FIG. 5 shows a view of a traffic area 30 having lane widening. That means that lane 31 widens into two lanes 32 and 33. Lane 31 is bordered by lane markings 31.1, 31.2 running generally parallel. Shortly after crossing over bordering line 34, the LKS function in a traditional driver assistance system would be deactivated because the parallelism in lane markings 31.1, 31.2 is lost due to lane widening. According to an example embodiment of the present invention, driver assistance system 1 now generates a reference line 31.a representing a first lane marking for a hypothetical lane 31.c on the basis of the steering wheel angle and/or on the basis of the yaw rate. Taking into account the lane hypothesis already described, i.e., assuming a standard width of the lane or continuing the width of lane 31 from which the vehicle has departed, second lane marking 31.b is formed, bordering hypothetical lane 31.c. After driving over bordering line 34, vehicle 10 thus continues to move on hypothetical lane 31.c until it again opens into actual lane 32, which is provided as a destination lane. A lane 31.c (hypothetical lane) having defined lane markings is thus present even in the area of lane widening, so the LKS function of driver assistance system 1 may also be utilized in the area of lane widening.

What is claimed is:

1. A method for controlling a driver assistance system that includes a lane keeping support (LKS) function of a vehicle, the method comprising:
   forming by the driver assistance system a hypothetical lane connecting a starting lane to a destination lane in an area of lane widening;
   wherein the forming step includes analyzing a reference steering wheel angle of the vehicle for the determination of a first lane marking of the hypothetical lane.

2. The method as recited in claim 1, further comprising:
   guiding the vehicle by the driver assistance system on the hypothetical lane in the area of lane widening.

3. The method as recited in claim 1, wherein the forming step further includes analyzing a reference yaw rate of the vehicle for the determination of a first lane marking of the hypothetical lane.

4. The method as recited in claim 1, wherein the forming step includes determining a second lane marking of the hypothetical lane by continuing a width of the starting lane.

5. The method as recited in claim 1, wherein the forming step includes determining a second lane marking of the hypothetical lane under the assumption of a standard width of the lane.

6. The method as recited in claim 1, wherein:
   the reference steering wheel angle is formed according to the following equation: $\delta_{Ref} = l * \kappa_{Road} + \alpha_V - \alpha_H$;
   l=wheel base;
   $\alpha_V$=inclined-position angle of front wheel;
   $\alpha_H$=inclined-position angle of rear wheel; and
   $\kappa_{Road}$=curvature of the lane.

7. The method as recited in claim 1, wherein:
   a steering movement of the vehicle is detected;
   a statistical value of the steering wheel angle is formed from the steering movement according to the following equation:

$$\overline{\delta} = \frac{1}{n} \sum_{i=0}^{n} \delta_{-i * t_{samp}};$$

$$n = \text{rounded}\left(\frac{t_1}{t_{samp}}\right);$$

$t_{samp}$=sampling time of the driver assistance system; and
$\delta$=steering wheel angle.

8. The method as recited in claim 1, wherein a plausibility check is performable for a direction decision for a selection of a destination lane by a steering wheel torque.

9. A method for controlling a driver assistance system that includes a lane keeping support (LKS) function of a vehicle, the method comprising:
   forming by the driver assistance system a hypothetical lane connecting a starting lane to a destination lane in an area of lane widening;
   wherein the forming step includes analyzing a reference yaw rate of the vehicle for the determination of a first lane marking of the hypothetical lane.

10. The method as recited in claim 9, wherein:
    the reference yaw rate ($\Psi_{Ref}$) is formed according to the following equation: $\Psi_{Ref} = V * \kappa_{Road}$;
    $\kappa_{Road}$=curvature of the lane; and
    V=speed of the vehicle.

11. The method as recited in claim 9, wherein:
    a transverse movement of the vehicle is detected;
    a statistical value of the yaw rate is formed from the transverse movement according to the following equation:

$$\overline{\Psi} = \frac{1}{n} \sum_{i=0}^{n} \Psi_{-i * t_{samp}};$$

$$n = \text{rounded}\left(\frac{t_1}{t_{samp}}\right);$$

$t_{samp}$=sampling time of the driver assistance system; and
$\Psi$=yaw rate.

12. The method as recited in claim 9, further comprising:
    guiding the vehicle by the driver assistance system on the hypothetical lane in the area of lane widening.

13. The method as recited in claim 9, wherein the forming step includes determining a second lane marking of the hypothetical lane by continuing a width of the starting lane.

14. The method as recited in claim 9, wherein the forming step includes determining a second lane marking of the hypothetical lane under the assumption of a standard width of the lane.

15. A method for controlling a driver assistance system that includes a lane keeping support (LKS) function of a vehicle, the method comprising:
   forming by the driver assistance system a hypothetical lane connecting a starting lane to a destination lane in an area of lane widening;
   wherein a lane that is selected as the destination lane is determined from the following cases:
   Case 1: $\Psi > \Psi_{Ref}$;
   Case 2: $\Psi < \Psi_{Ref}$; and
   Case 3: $\Psi = \Psi_{Ref}$;
   wherein $\Psi$ is a yaw rate and $\Psi_{Ref}$ is a reference yaw rate.

16. The method as recited in claim 15, further comprising:
   guiding the vehicle by the driver assistance system on the hypothetical lane in the area of lane widening.

17. The method as recited in claim 15, wherein the forming step includes determining a second lane marking of the hypothetical lane by continuing a width of the starting lane.

18. The method as recited in claim 15, wherein the forming step includes determining a second lane marking of the hypothetical lane under the assumption of a standard width of the lane.

* * * * *